(12) United States Patent
Wu et al.

(10) Patent No.: US 7,826,366 B2
(45) Date of Patent: Nov. 2, 2010

(54) JOINT CHANNEL ASSIGNMENT AND ROUTING IN WIRELESS NETWORKS

(75) Inventors: Haitao Wu, Redmond, WA (US); Kun Tan, Redmond, WA (US); Fan Yang, Redmond, WA (US); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 11/557,269

(22) Filed: Nov. 7, 2006

(65) Prior Publication Data

US 2008/0107069 A1 May 8, 2008

(51) Int. Cl.
*H04J 3/14* (2006.01)
*H04J 1/16* (2006.01)
*H04W 72/00* (2009.01)

(52) U.S. Cl. .................. 370/235; 370/329; 370/228; 370/338; 455/450; 455/451

(58) Field of Classification Search .............. 455/450, 455/451, 452.1, 452.2, 453; 370/228, 338, 370/235
See application file for complete search history.

(56) References Cited

U.S. PATENT DOCUMENTS

| | | | |
|---|---|---|---|
| 6,112,092 A | 8/2000 | Benveniste | |
| 6,366,780 B1 * | 4/2002 | Obhan | 455/453 |
| 6,687,239 B1 | 2/2004 | Koprivica | |
| 6,721,290 B1 | 4/2004 | Kondylis et al. | |
| 6,842,430 B1 | 1/2005 | Melnik | |
| 6,865,371 B2 | 3/2005 | Salonidis et al. | |
| 6,907,243 B1 | 6/2005 | Patel | |
| 6,917,811 B2 | 7/2005 | Kim et al. | |
| 6,963,747 B1 * | 11/2005 | Elliott | 455/450 |
| 8,961,310 | 11/2005 | Cain | |
| 6,977,912 B1 | 12/2005 | Porter et al. | |
| 7,031,293 B1 | 4/2006 | Srikrishna et al. | |
| 2003/0054818 A1 | 3/2003 | Bahl et al. | |
| 2004/0014491 A1 * | 1/2004 | Weigand | 455/552.1 |
| 2004/0063401 A1 | 4/2004 | Meckelburg et al. | |
| 2004/0090924 A1 | 5/2004 | Giaimo et al. | |
| 2004/0157613 A1 | 8/2004 | Steer et al. | |
| 2004/0166853 A1 | 8/2004 | Takeda et al. | |
| 2005/0053007 A1 | 3/2005 | Bernhardt et al. | |
| 2005/0063313 A1 | 3/2005 | Nanavati et al. | |
| 2005/0100029 A1 | 5/2005 | Das | |
| 2005/0125302 A1 | 6/2005 | Brown et al. | |
| 2005/0180444 A1 | 8/2005 | Gu et al. | |
| 2005/0208949 A1 | 9/2005 | Chiueh | |

(Continued)

OTHER PUBLICATIONS

Bahl, et al., "SSCH: Slotted Seeded Channel Hopping for Capacity Improvement in IEEE 802.11 Ad-Hoc Wireless Networks", MobiCom, ACM, Sep. 26-Oct. 1, 2004, 15 pages.

(Continued)

*Primary Examiner*—Nick Corsaro
*Assistant Examiner*—Manpreet S Matharu
(74) *Attorney, Agent, or Firm*—Lee & Hayes, PLLC

(57) ABSTRACT

In a described implementation, a channel cost metric (CCM) is determined in a wireless network environment. The CCM may be determined responsive to an expected transmission time (ETT) and a frequency of air time (FAT), which reflects a channel utilization. In an example implementation, a channel assignment and/or a routing for a network configuration may be switched responsive to the determined CCM.

20 Claims, 8 Drawing Sheets

U.S. PATENT DOCUMENTS

| | | |
|---|---|---|
| 2005/0271006 A1 | 12/2005 | Chari et al. |
| 2005/0286426 A1 | 12/2005 | Padhye et al. |
| 2005/0286440 A1* | 12/2005 | Strutt et al. ............... 370/253 |
| 2006/0023677 A1 | 2/2006 | Labrador et al. |
| 2006/0089150 A1* | 4/2006 | Agin ........................ 455/453 |
| 2006/0281467 A1* | 12/2006 | Kim et al. ................ 455/450 |
| 2006/0285514 A1 | 12/2006 | Hoerl et al. |
| 2007/0201381 A1 | 8/2007 | Ekl et al. |
| 2008/0205317 A1 | 8/2008 | Piipponen et al. |

OTHER PUBLICATIONS

Battiti, et al., "Distributed Saturation Degree Methods for Code Assignment in Multihop Radio Networks", WSDAAL2000, Ischia(NA), Sep. 18-20, 2000, 3 pages.

Draves, et al., "Routing in Multi-Radio, Multi-Hop Wireless Mesh Networks", MobiCom, ACM, Sep. 26-Oct 1, 2004, 15 pages.

Muqattash, et al., "CDMA-Based MAC Protocol for Wireless Ad Hoc Networks", ACM, 2003, pp. 153-164.

Raniwala, et al., "Architecture and Algorithms for an IEEE 802:11-Based Multi-Channel Wireless Mesh Network", Stony Brook University, Computer Science Department, 12 pages.

Raniwala, et al., "Centralized Channel Assignment and Routing Algorithms for Multi-Channel Wireless Mesh Networks", Mobile Computing and Communications Review, vol. 8, No. 2, pp. 50-65.

So, et el., "Multi-Channel MAC for Ad Hoc Networks: Handling Multi-Channel Hidden Terminals Using A Single Transceiver", MobiHoc '04, ACM, 2004, pp. 222-233.

So, et al., "Routing and Channel Assignment in Multi-Channel Multi-Hop Wireless Networks with Single-NIC Devices", University of Illinios, Technical Report, Dec. 2004, 12 pages.

Wu, et al., "A New Multi-Channel MAC Protocol with On-Demand Channel Assignment for Multi-Hop Mobile Ad Hoc Networks", IEEE, 2000, pp. 232-237.

* cited by examiner

JOINT CHANNEL ASSIGNMENT AND ROUTING IN WIRELESS NETWORKS

BACKGROUND

Some wireless networks are pre-planned and centrally-controlled. A single provider usually organizes all of the wireless nodes and installs the infrastructure. Operationally, centralized manager agents have access to a wealth of knowledge about how the wireless network is functioning. Consequently, such pre-planned and centrally-controlled wireless networks can avoid or rapidly respond to the problems that typify wireless networks, such as poor signal coverage, interference, channel reuse, communication routing, and so forth.

Ad hoc networks, on the other hand, do not usually involve significant pre-planning or centralized control. One or a few wireless nodes are often established by individuals. These individuals activate their respective wireless nodes, which are designed to automatically interoperate with other wireless nodes. However, these wireless nodes are designed to directly interact with only a few other wireless nodes, such as neighbor nodes. Consequently, because of a lack of higher-level coordination, ad hoc wireless networks are generally more susceptible to traditional wireless network problems.

SUMMARY

In a described implementation, a channel cost metric (CCM) is determined in a wireless network environment. The CCM may be determined responsive to an expected transmission time (ETT) and a frequency of air time (FAT), which reflects a channel utilization. In an example implementation, a channel assignment and/or a routing for a network configuration may be switched responsive to the determined CCM.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Joint Channel Assignment and Routing in Wireless Networks

As described herein above, because of a lack of higher-level coordination, ad hoc wireless networks are generally more susceptible to traditional wireless network problems. Nevertheless, due to their low costs, ease of deployment, increased coverage, and enhanced capacity (e.g., via spatial reuse), multi-hop wireless networks such as mesh networks that utilize inexpensive and readily available wireless interfaces are touted as the new frontier of wireless networking.

One example family of wireless networking standards is the IEEE 802.11 family. Multiple orthogonal channels are defined in these IEEE standards. For example, there are 3 orthogonal channels for 802.11b and 13 for 802.11a. This number of orthogonal channels provides a capability for interference mitigation among nearby wireless access networks.

Meanwhile, with cheaper hardware adopting diverse wireless technologies, it is expected that many mobile devices may be equipped with more than one radio (e.g., more than a single wireless network interface card (NIC)). These devices may therefore construct a Multi-radio Multi-channel Multi-hop Wireless Network ($M^3WN$). In reality, if there are multiple radios on some wireless nodes, it is most likely that these radios are heterogeneous. For example, a wireless node may simultaneously have an Ultra Wide-Band (UWB) radio and an 802.11 radio, or a wireless node may simultaneously have an 802.11a radio and an 802.11g radio.

Figure 1:
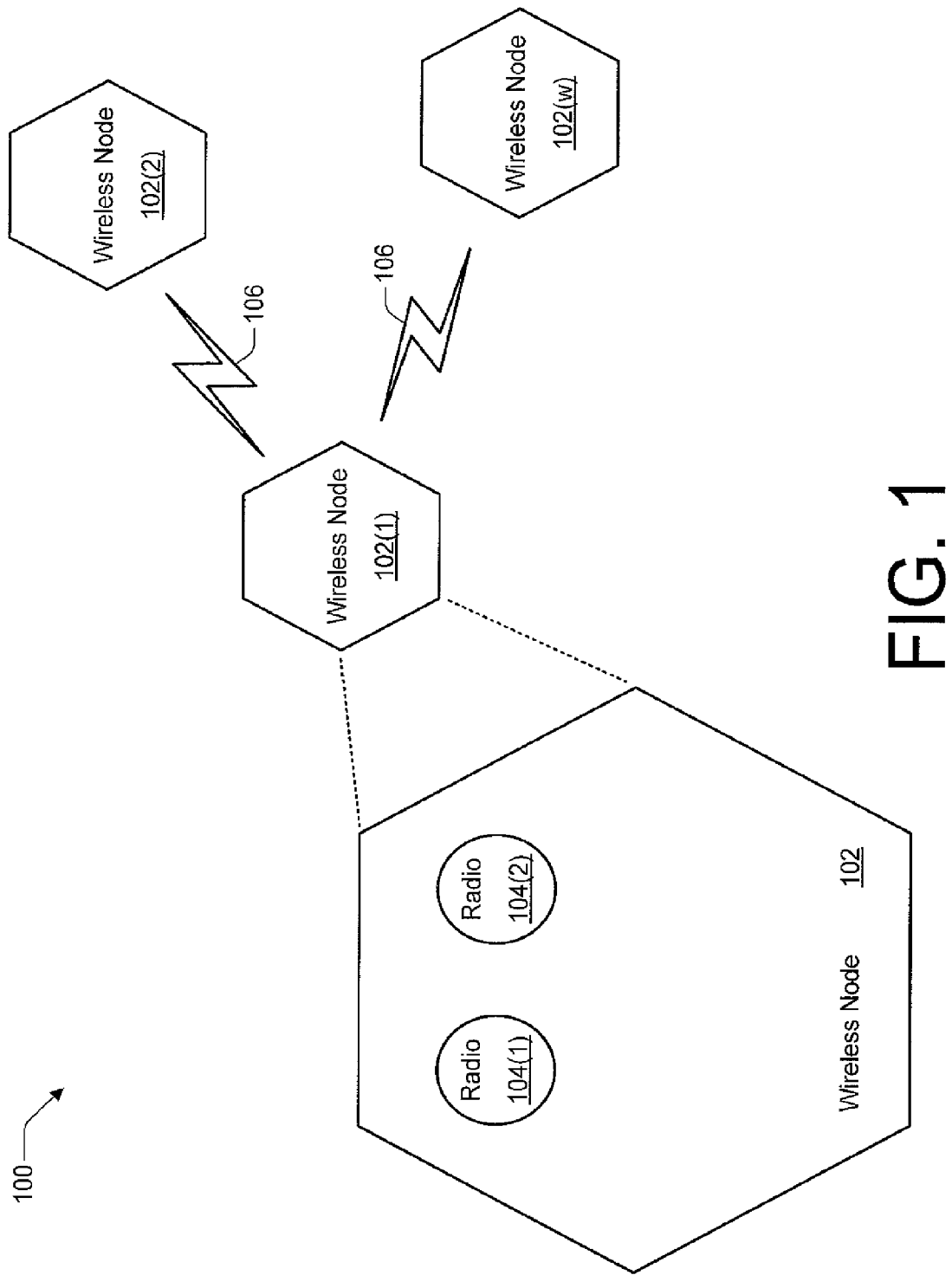
FIG. 1 is a block diagram illustrating an example of a wireless network environment.

FIG. 1 is a block diagram illustrating an example of a wireless network environment 100. Wireless network 100 includes multiple wireless nodes 102. As illustrated, wireless network 100 includes "w" wireless nodes 102(1), 102(2) . . . 102(w), with "w" being some integer. Each wireless node 102 may be realized by, for example, an electronic device. An example device is described herein below with particular reference to FIG. 8.

Wireless nodes 102 may be in wireless communication with one or more other wireless nodes 102 via at least one wireless link 106. To enable such communication, each wireless node 102 includes at least one radio 104. In fact, many such wireless nodes 102 may include multiple radios 104, such as radio 104(1) and radio 104(2). Although only two radios 104 are shown, each wireless node 102 may have any number of radios 104.

Each radio 104 enables a wireless node 102 to communicate on a different interface, perhaps simultaneously. Each radio is typically capable of communicating in accordance with at least one wireless standard. Example wireless standards include, but are not limited to, IEEE 802.11a, IEEE 802.11b, IEEE 802.11g, other IEEE 802.11 standards, UWB, and so forth.

Many attractive and promising features of $M^3WN$ provide motivation to consider how to efficiently leverage the features of multi-radio and multi-channel nodes so as to conquer and/or reduce the wireless interference that widely exists in classical multi-hop wireless networks. To effectively mitigate interference, both routing and channel assignment (CA) should be carefully designed. Here, routing selects the path from the source to the destination for connections, and it thus assigns traffic to each radio and link. CA determines the channel that a radio interface should use. It is apparent that CA and routing are coupled in $M^3$ WNs, as is discussed below.

On one hand, CA determines the connectivity between radios because two radios can communicate with each other only when they are on a common channel. CA therefore determines the network topology. Routing decisions are made based on the network topology. Thus, CA has a direct impact on routing. On the other hand, as is shown below, to achieve better results, CA should be dynamically adjusted according to the traffic status, which is determined by a routing algorithm. Consequently, routing and CA are tightly coupled.

Based on this observation, CA and routing are described herein as being jointly optimized to improve the performance of $M^3$WNs. Moreover, such a joint CA and routing (JCAR) algorithm is performed by each node in a distributed and cooperative way so that the resultant network can have a desired self-organization feature.

There are several challenges in effectively realizing a practical distributed algorithm that jointly considers CA and routing in heterogeneous $M^3$ WNs. Four example challenges are described below. First, to design a distributed algorithm performed at each node, a quantitative measure of the performance gain of any new JCAR pattern (patterns are described herein below with particular reference to FIG. 2) is clearly defined so that decisions based on this measure can be made. Here, a JCAR pattern is used to denote any specific combined solution of channel assignment and routing. Therefore, a quantified metric is needed to represent the performance gain in searching for new patterns.

Second, in most practical cases, a portion of nodes can have multiple heterogeneous radios. This implies that there might be no common radio or common channel supported throughout a whole network for both data transmission and signaling (e.g., routing messages). Such radio heterogeneity makes the design of the routing and CA extremely difficult as a careless design may result in network partition.

Third, the signaling overhead to obtain updated traffic and link state information for JCAR in such a heterogeneous environment really presents challenges for the feasibility of a distributed algorithm. Fourth, the limited capability of off-the-shelf standard hardware also imposes challenges in the protocol design for a distributed algorithm (e.g., the overhead of 802.11a/b/g NICs on channel switching may be taken into account). Meanwhile, it can be beneficial for a distributed algorithm to be extensible for future hardware and MAC standards (e.g., UWB devices).

These challenges are not fully addressed by any existing approach. Existing theoretical works commonly assume perfect MAC (i.e., no collision due to perfect slot allocation). They also assume that a centralized controller has all of the information, which makes their approximated algorithms difficult to apply in real-world deployments. Meanwhile, those existing algorithms that are somewhat distributed in nature primarily address routing and channel assignment as separate problems. They therefore do not target a joint practical solution.

In contrast, an example described implementation entails a unified, distributed software framework for joint CA and routing (JCAR). The software framework resides between the Layer 2 MAC (e.g., in accordance with standard 802.11 concepts and terminology) and the Layer 3 Routing. A described Layer 2.5 module coordinates wireless devices and radios to superior performance by jointly considering channel assignment and routing. Four example attributes of a described JCAR implementation are listed below. However, it should be understood that actual individual implementations may reflect less than all or even none of these four example attributes.

First, a meaningful metric is defined. It is termed Channel Cost Metric (CCM) herein. It reflects the expected transmission cost (due to interference) as weighted by channel utilization. CCM captures the effect of channel interferences and the benefit of channel diversity. The smaller the CCM, the better the performance for a given JCAR pattern. In deriving an expression for CCM, the following concept is introduced: "equivalent fraction of air time". This equivalent fraction of air time not only reflects the channel busy time, but it also provides a common reference value for heterogeneous radios.

Second, a distributed algorithm is described that is based on the CCM. The algorithm effectively selects the JCAR pattern having the smallest CCM value among a subset of potential JCAR patterns. To simplify the heuristic and to avoid potential routing oscillations, the analysis is restricted to the patterns that maintain network connectivity. Moreover, the selection of interfaces is restricted to between the local node (which initiates any changes) and its one-hop neighbors, instead of changing an entire communication path along a substantial portion of or the entire network. However, the explicitly described implementations may be extended to encompass a greater number of patterns and/or interfaces.

Third, a described implementation of the example Layer 2.5 JCAR module is designed to perform CA and routing jointly at a time scale of seconds or even tens of seconds. This example implementation takes into consideration the practical overhead of off-the-shelf hardware with respect to channel switching. Thus, the algorithm does not require tight clock synchronization among neighbor nodes. Fourth, the specifics described herein for the example Layer 2.5 JCAR module are selected such that they do not need any modification for current 802.11 devices. However, the principles and some of the specifics can also be applied to other wireless systems, such as UWB, and so forth.

Example Implementations for Joint Channel Assignment and Routing in Wireless Networks 1. Outline of Example Implementations Subsections In this section, example implementations for joint channel assignment and routing for a heterogeneous multi-radio multi-channel multi-hop wireless network are described. In pursuit of an algorithm that may be implemented in a distributed fashion, CCM is described as a metric that quantifies the differences among various JCAR patterns in terms of air time cost due to collisions. To implement a distributed JCAR algorithm, a JCAR pattern that results in the smallest metric at each node is selected locally. The feasibility and connectivity of each potential pattern are checked by the algorithm.

Implementations of the CCM are described in subsection 2. Implementations of the distributed JCAR algorithm are described in subsection 3. Implementations of the Layer 2.5 JCAR module are described in subsection 4. This module may reside between the 802.11 MAC and routing layers to coordinate—in a distributed fashion and without resorting to tight clock synchronization—the channel assignment and routing among neighboring nodes in a multi-hop wireless network. Example pseudo code implementations and refinements are described in subsection 5. Subsection 6 describes an example device realization for wireless nodes that can implement JCAR.

2. CCM: Example Metric for JCAR

As aforementioned, one major challenge in designing a distributed algorithm is what metric is to be used to quantify the performance of a specific joint CA and routing pattern. Example patterns are illustrated in FIG. 2.

Figure 2:
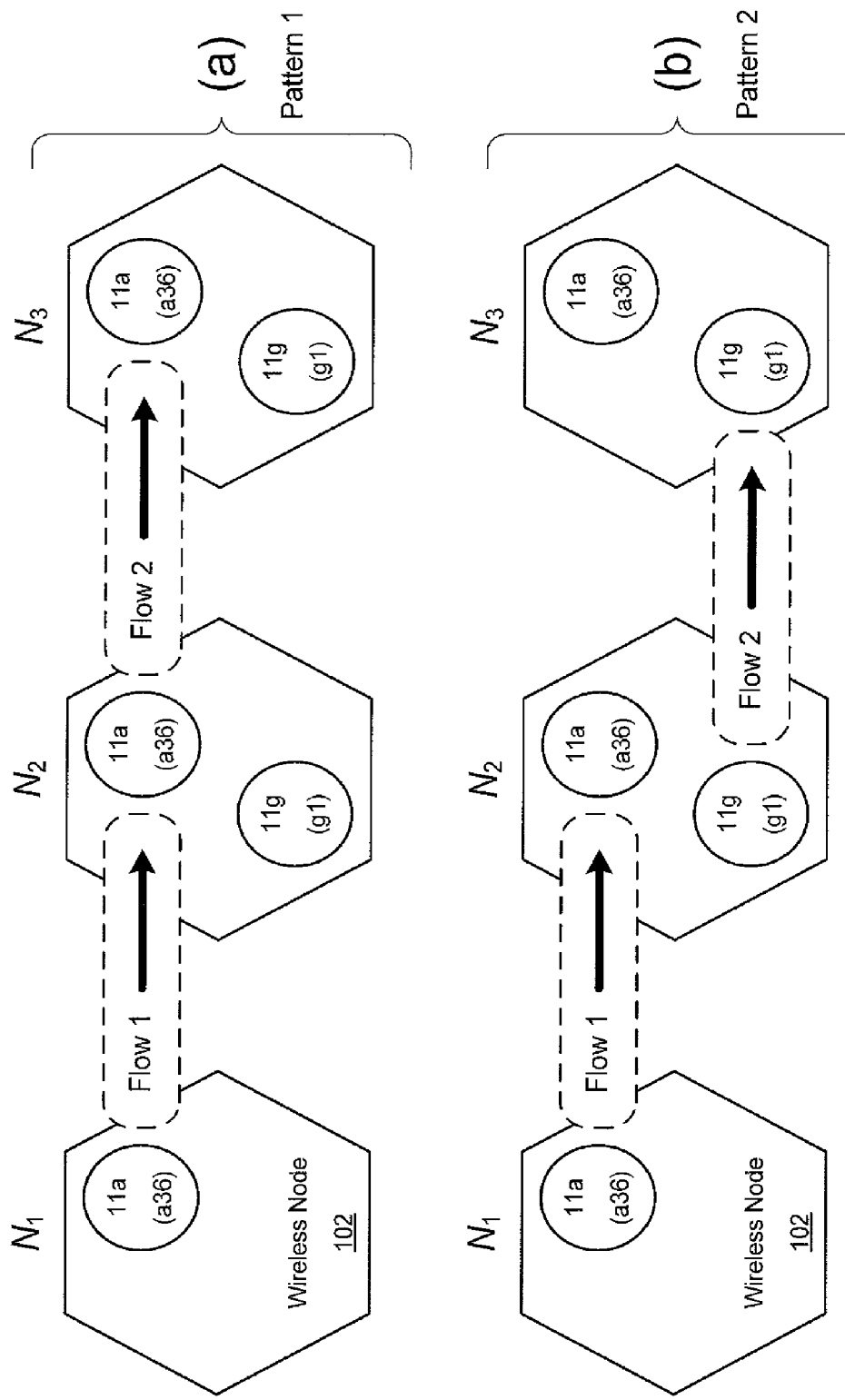
FIG. 2 is a block diagram illustrating example channel assignment and radio interface routing patterns for a communication path in a wireless network.

FIG. 2 is a block diagram 200 illustrating example channel assignment and radio interface routing patterns for a communication path in a wireless network. FIG. 2 includes a first pattern at FIG. 2(a) and a second pattern at FIG. 2(b). Each pattern involves three wireless nodes 102: $N_1$, $N_2$, and $N_3$. Node $N_1$ includes one 802.11a radio, and nodes $N_2$ and $N_3$ both include one 802.11a radio and one 802.11g radio. The radios, as represented by circles, indicate the radio type (e.g., 11a or 11g) in the top half of the circle and the current channel (e.g., a36 or g1) in the bottom half.

Each pattern includes a first flow 1 between nodes $N_1$ and $N_2$ and a second flow 2 between nodes $N_2$ and $N_3$. With pattern 1 in FIG. 2(a), flow 1 is between the 802.11a radios on channel a36. Flow 2 is also between the 802.11a radios on channel a36. With pattern 2 in FIG. 2(b), flow 1 is still between the 802.11a radios on channel a36. Flow 2, however, has been switched to being between the 802.11g radios on channel g1.

More specifically, assume that the traffic flows are fixed-rate traffic flows. In FIG. 2(a), both Flow1 and Flow2 are assigned to channel a36 (which is referred to as pattern1). In FIG. 2(b), Flow1 is assigned to channel a36, and flow2 is assigned to channel g1 on a different interface (which is referred to as pattern2). As apparent from the diagram, pattern2 (which is initiated at node $N_2$) is much more desirable than pattern 1 because there is no interference between the flows in pattern2 with the channels used. The question is how can it be quantified that pattern2 is indeed better than pattern1?

In this subsection, the Channel Cost Metric (CCM) is introduced. CCM represents the expected transmission time on each channel as weighted by channel utilization. It relatively explicitly captures the effect of the interference from hidden links. Once the CCM is defined, an objective becomes to find a joint CA and routing pattern which has a superior (e.g., a minimal) CCM value Minimizing the weighted air time cost (and the impact of interference) is equivalent to an example real-world objective—maximizing the system throughput.

2.1 Intuition for Metric Definition

In wireless networks, interference from near-by channels (most of the time from hidden terminals or links) has a significant negative impact on the system throughput. Interference results in packet collisions and retransmissions. Due to interference, the expected transmission time $ETT_i^l$, of all the packets on channel l, per unit time, observed at node i, is much longer. The $ETT^l$, on a per-link basis, is one of the most used metrics to measure air time cost affected by interferences. Reducing or even minimizing $ETT_i^l$ (which implies that the interference due to hidden terminals is minimized) results in increasing the system throughput. It is therefore captured in the proposed CCM. However, metrics containing ETT alone may not accurately represent the real performance gain in heterogenous environments.

In certain cases such as the example shown in the two patterns of FIG. 2, there are no hidden terminals. (Consequently, there are no collisions if the collisions for transmission in the carrier sensing range are ignored.) The $ETT_i^l$ under pattern1 and under pattern2 are the same. (It is assumed here that pattern1 is the currently deployed one while pattern2 is a candidate one. They are then compared by assuming the same amount of traffic for both patterns.) It is thus clear that the benefit of the channel diversity in pattern2 cannot be appreciated by considering $ETT_i^l$ alone. By carefully examining the channel utilization in FIG. 2, it can be noticed that under pattern1 the utilization of channel a36 is about twice of that under pattern2 with the same traffic demand.

The impact of a busy channel on the $ETT_i^l$ and the overall system performance is dramatically different from that of a less-busy channel. Consequently, for a described implementation, an $ETT_i^l$ that is weighted by the channel utilization is included in the CCM. To this end, another concept is introduced: fraction of air time (FAT). The FAT concept is to represent the normalized overall channel utilization. For channel l at node i, FAT, $F_i^l$, is defined as the ratio of the total air time consumed (over all the links which use channel l within the interference range of node i) in a given time interval to the length of that given time interval. Intuitively, from the view point of node $N_2$ in FIG. 2, assuming there are always packets to transmit for pattern1, channel a36 will always be busy. Hence, the fraction of air time consumed (i.e., the channel utilization), $F_{N_2}^{a36}=1$ with pattern1. When the same number of packets is to be transmitted, the fraction of air time consumed under pattern2 is only 0.5 for channel a36 and g1, respectively.

Based on the above observations, it is apparent that an ETT weighted by FAT can be included in CCM. Hence, the metric CCM is defined for node i in terms of ETT and FAT as follows.

$$CCM_i = \Sigma_l(ETT_i^l)F_i^l, \quad (1)$$

which is the summation of the expected transmission time weighted by the fraction of air time over all the channels at node i. An example closed form expression for CCM is provided below. For the example in FIG. 2, under pattern1, $CCM_{N_2}=2ETT$, while to support the same amount of traffic under pattern2, $CCM_{N_2}=ETT$ where $ETT=ETT_{N_2}^{a36}=ETT_{N_2}^{g1}$. Based on this CCM metric, it is apparent that pattern2 is better than pattern1. The advantage of the channel diversity and the impact of interference are therefore captured in CCM.

Before presenting a closed form expression for CCM, some notation to be used is described. The function $I_{(x,y)}^l$ is defined as follows. If node x locates within the interference range of node y for channel l, then $I_{(x,y)}^l=1$, otherwise, $I_{(x,y)}^l=0$. It should be noted that $I_{(x,y)}^l=I_{(y,x)}^l$ because it is assumed that the interference is symmetric.

Let $L_{(i,j)}^l$ denote the link between nodes i and j on channel l, and let $IN_i^l$ denote the set of the interfering nodes that reside in the interference range of node i on channel l, that is, $IN_i^l = \{x | I_{(i,x)}^l=1, x \in V\}$ and $IL_i^l$ denote the set of interfering links whose source or destination nodes belong to $IN_i^l$, that is, $$IL_i^l = \{L_{(m,n)}^l | m \in IN_i^l, n \in V \text{ or } m \in V, n \in IN_i^l\},$$

where V denotes the set of all the nodes in the network.

In the following portions 2.2 and 2.3 of subsection 2, expressions for ETT and FAT are derived by explicitly considering the channel interference due to hidden terminals/links.

Figure 3:
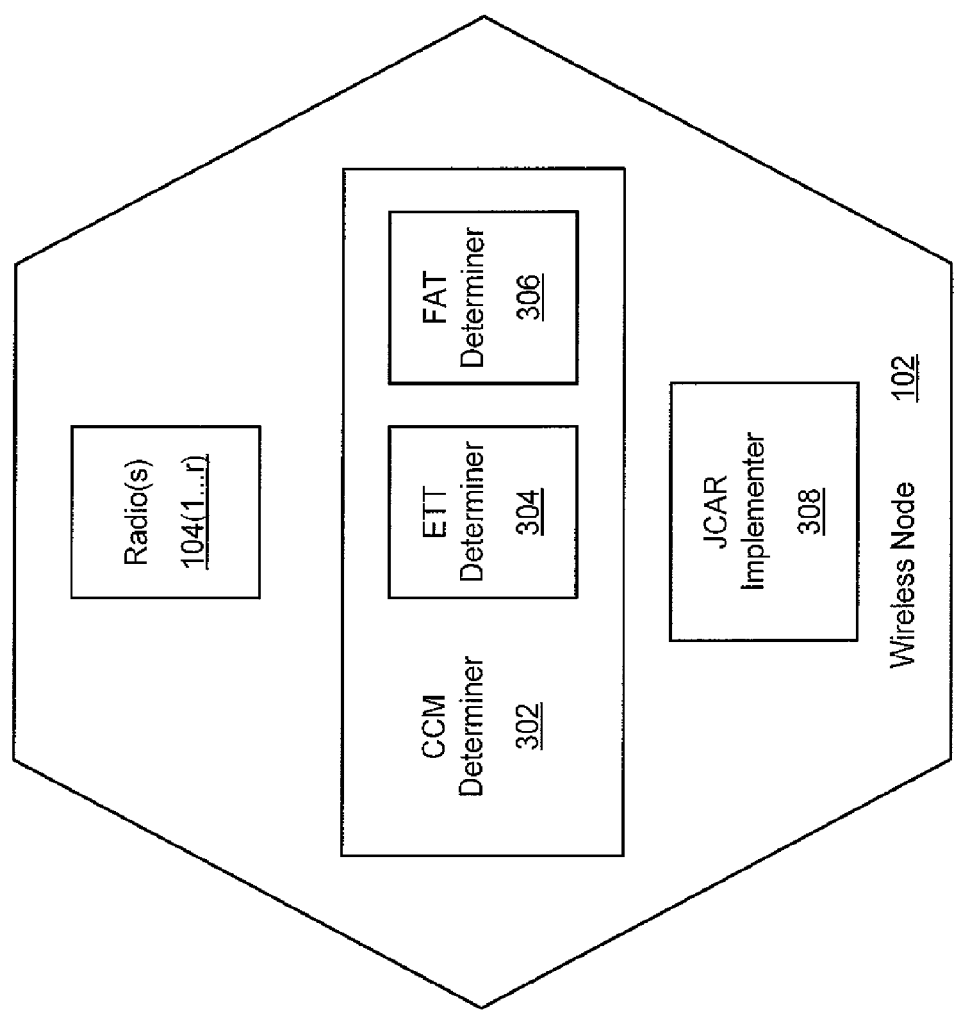
FIG. 3 is a block diagram of an example wireless node that is capable of implementing joint channel assignment and routing (JCAR).

FIG. 3 is a block diagram of an example wireless node 102 that is capable of implementing JCAR. As illustrated, wireless node 102 includes at least one radio 104, a CCM determiner 302, and a JCAR implementer 308. More specifically, "r" radios 104(1 ... r) are shown, with "r" being some integer. Although a certain number of components 104, 302, and 308 are shown, each wireless node 102 may include any number of such components. Components 104, 302, and 308 may be implemented in hardware, software, firmware, some combination thereof, and so forth.

In a described implementation, CCM determiner 302 includes an ETT determiner 304 and a FAT determiner 306.

Example implementations for CCM determiner 302 are described generally in this subsection 2.1 and more specifically in subsection 2.4. Example implementations for ETT determiner 304 are described in subsection 2.2, and example implementations for FAT determiner 306 are described in subsection 2.3. Example implementations for JCAR implementer 308 are described in subsection 3.

In a described implementation generally, radio(s) 104 are to communicate over at least one link on at least one channel. CCM determiner 302 is to determine a CCM value. ETT determiner 304 is to determine an ETT value, and FAT determiner 306 is to determine a FAT value that represents a total consumed air time proportion of a given interval. With the ETT values and FAT values, CCM determiner 302 is to determine the CCM value responsive to the ETT value and the FAT value such that the CCM value represents an expected transmission time on each channel that is weighted by channel utilization.

As is described further herein below, the ETT values and the FAT values may be determined on a per-wireless-node basis, instead of only on a per-link basis. JCAR implementer 308 is to switch at least one of a channel or a routing in a wireless network in which wireless node 102 is participating so as to lower a CCM level in the wireless network. As described in greater detail herein below, each of these components that are illustrated in FIG. 3 may perform alternative and/or extended functions.

2.2 Expected Transmission Time (ETT)

It is assumed that the system is stable and that a collision probability (due to interference) exists and is denoted by $p_{(i,j)}^l$ for link $L_{(i,j)}^l$. It is also assumed that the traffic data rate (offered traffic load) on that link is $r_{(i,j)}^l$ packets/s. Following the exponential backoff procedure and retransmission limit m defined in 802.11 DCF (Distributed Coordination Function), the expected total traffic including retransmissions on channel l is given by $$\lambda_{(i,j)}^l = r_{(i,j)}^l \left[ m(p_{(i,j)}^l)^m + \sum_{k=1}^{m} k(p_{(i,j)}^l)^{k-1}(1-p_{(i,j)}^l) \right] \quad (2)$$

$$\approx r_{(i,j)}^l / (1-p_{(i,j)}^l).$$

Let $T_{(i,j)}^{l,DATA}$ denote the average transmission time of one data frame on linked $L_{(i,j)}^l$. It should be noted that the transmission time for a frame includes the air time cost for MAC and PHY overheads (headers) on channel l, $t_{(i,j)}^{l,headers}$. Letting the average payload size on link $L_{(i,j)}^l$ be $PL_{(i,j)}^l$ and the link capacity be $c_{(i,j)}^l$, we derive:

$$T_{(i,j)}^{l,DATA} = t_{(i,j)}^{l,headers} + PL_{(i,j)}^l / c_{(i,j)}^l. \quad (3)$$

Then the ETT for a packet on link $L_{(i,j)}^l$ in a unit time can be expressed as $$ETT_{(i,j)}^l = T_{(i,j)}^{l,DATA} / (1-p_{(i,j)}^l). \quad (4)$$

And the total ETT for all packets on link $L_{(i,j)}^l$ in a time unit can be expressed as $$r_{(i,j)}^l \cdot ETT_{(i,j)}^l = \lambda_{(i,j)}^l T_{(i,j)}^{l,DATA}. \quad (5)$$

The value of $r_{(i,j)}^l \cdot ETT_{(i,j)}^l$ on link $L_{(i,j)}^l$ is a real number between 0 and 1, and it depends on the collision probability $p_{(i,j)}^l$. The derivation of $p_{(i,j)}^l$ depends on the interference from hidden terminals/links.

In a described implementation, each node, say node i, considers the ETTs on channel l for the links within an interference range (e.g., a two hop range) because the transmissions on those links may conflict with links to/from node i. Thus, the total ETT for all packets over all links (within the interference range of node i) on channel l in one time unit may be given by $$ETT_i^l = \sum_{L_{(m,n)}^l \in IL_i^l} r_{(m,n)}^l ETT_{(m,n)}^l = \sum_{L_{(m,n)}^l \in IL_i^l} \lambda_{(m,n)}^l T_{(m,n)}^{l,DATA}. \quad (6)$$

2.3 Normalized Channel Occupation Time—Fraction of Air Time

An expression for the fraction of air time (FAT), which is qualitatively defined above, is derived here. FAT is the ratio of the total air time consumed in a given time interval to the length of that given time interval. In a described implementation, the length of the time interval is set sufficiently large relative to the air time cost of a packet (of maximal size). In this description, by way of example only, this time interval is set to be 1 second.

The air time of transmitting a packet in a shared wireless link varies over time. For the 802.11 DCF, in addition to the actual packet transmission time, the air time also includes the "overhead" time for carrier sensing, back-off, MAC ACK, retransmission, and so forth. It depends on how busy a channel is as well as the number of collisions a packet experiences.

An expression for FAT on an 802.11 link is derived herein as an example. However, the derivation for other standards may be performed similarly. The consumed FAT of the traffic at link $L_{(i,j)}^l$ is given by, $$F_{(i,j)}^l = r_{(i,j)}^l t_{(i,j)}^l, \quad (7)$$

where $t_{(i,j)}^l$ denotes the total air time cost (including overhead) for a packet with an average length PL at link $L_{(i,j)}^l$. It is established so that $0 \leq F_{(i,j)}^l \leq 1$.

In the following, an expression for $t_{(i,j)}^l$ is derived. It is assumed that the current packet collision probability of link $L_{(i,j)}^l$ is $p_{(i,j)}^l$, and that the average packet length is $PL_{(i,j)}^l$. An approximate expression for $t_{(i,j)}^l$ is then given by $$t_{(i,j)}^l = \sum_{k=1}^{m} (p_{(i,j)}^l)^{k-1}(1-p_{(i,j)}^l)(T_{(i,j)}^{l,s} + (k-1)T_{(i,j)}^{l,c}) + (p_{(i,j)}^l)^m m T_{(i,j)}^{l,c}, \quad (8)$$

where m is the maximal number of (re)transmissions, $T_{(i,j)}^{l,s}$, and $T_{(i,j)}^{l,c}$ are the average air time cost of a successful and failed transmission, respectively, of a packet on link $L_{(i,j)}^l$ with average packet length $PL_{(i,j)}^l$. The value of m as defined in 802.11 is 4 for the basic access method and 7 for the RTC/CTS access method. Estimation of $T_{(i,j)}^{l,s}$, and $T_{(i,j)}^{l,c}$ generally entails knowledge of physical link parameters such as the overhead introduced by the backoff, the frame header size, and the link rate (capacity) $c_{(i,j)}^l$ of link $L_{(i,j)}^l$. The air time cost $T_{(i,j)}^{l,s}$ for the basic access method is given by $$T_{(i,j)}^{l,s} = t_{backoff}^l + t_{headers}^l + t_{ACK}^l + PL_{(i,j)}^l / c_{(i,j)}^l + t_{SIFS}^l. \quad (9)$$

The notation FAT introduced above represents the normalized utilization on a certain channel. However, the same numerical value of FAT on different radios may have a different impact on the system performance in networks with heterogeneous radios. For example, the remaining capacity on an 802.11b link with a FAT of 0.5 is much less than that on an 802.11a link with a FAT of 0.5. In order to have a fair comparison for different links, the FAT of different channels is computed based on one common reference channel. In a described implementation, this common reference channel is selected such that it has the largest capacity, but alternative selection criteria may be used. The resulting FAT (with reference to the common channel) it termed herein equivalent FAT.

For a given node, it is assumed that the capacity of channel l* is the largest and that channel l* is selected as the common reference channel. Assume that link $L_{(i,j)}^l$ virtually uses two different (heterogeneous) channels l and l*, the equivalent FAT of channel l (relative to l*) is defined as $$F_{(i,j)}^{l,l*} = r_{(i,j)}^l t_{(i,j)}^{l,l*}, \quad (10)$$

where $t_{(i,j)}^{l,l*}$ denotes the air time cost for a packet with average length $PL_{(i,j)}^l$ on channel l* with loss probability $p_{(i,j)}^l$, i.e., $$t_{(i,j)}^{l,l*} = \quad (11)$$
$$\sum_{k=1}^{m} (p_{(i,j)}^l)^{k-1}(1 - p_{(i,j)}^l)(T_{(i,j)}^{l*,s} + (k-1)T_{(i,j)}^{l*,c}) + (p_{(i,j)}^l)^m m T_{(i,j)}^{l*,c}.$$

The equivalent FAT introduced above provides a fair comparison among heterogeneous radios/links. In addition, it can also be applied to homogenous radios when the link rate and loss ratio may be different due to different distance, path loss, etc.

Similar to the case of total ETT, each node, say node i, also considers the channel occupation on a channel l for each of the links within a predetermined interference range (e.g., a two hop range) because the transmissions on those links may conflict with links to/from node i. Thus, the total FAT for all packets over all links (within the interference range of node i) on channel l may be given by $$F_i^{l,l*} = \sum_{L_{(m,n)}^l \in IL_i^l} F_{(m,n)}^{l,l*}. \quad (12)$$

2.4 A Closed Form Expression for CCM

Placing ETT and FAT in eqs. (6) and (12) into eq. (1), a closed form expression for an example implementation of the metric $CCM_i$ is then given by $$CCM_i = \sum_l ETT_i^l F_i^{l,l*} = \sum_l \sum_{L_{(m,n)}^l \in IL_i^l} \lambda_{(m,n)}^l T_{(m,n)}^{l,DATA} F_i^{l,l*}. \quad (13)$$

As the described CCM represents the total normalized ETT for the data packets on channel l, as weighted by the equivalent channel utilization $F_i^{l,l*}$, the smaller the value of the metric, the greater the chance the network has for throughput improvement. Furthermore, the value of $\lambda_{(m,n)}^l T_{(m,n)}^{l,DATA}$ from link $l_{(m,n)}^l$ (which lies within the example two hop interference range of node i) contributes most to the collision probability on other links that are affected by this hidden link $l_{(m,n)}^l$, so smaller value of the metric imply a smaller cost of collisions for a given CA and routing pattern.

3. Distributed Algorithm for JCAR

After describing an example CCM implementation, a distributed algorithm for applying the CCM in the context of JCAR may be described. For a given network model and set of traffic demands (e.g., such as those described above in subsection 2), the goal of the algorithm is to find a feasible JCAR pattern p such that $CCM_{i,p}$ is minimized or at least lowered, where $CCM_{i,p}$ denotes the metric value under patterns for a given node i.

However, finding a true global solution is fairly complicated. For the sake of clarity, the following description presents a heuristic distributed algorithm which reactively searches for a better JCAR pattern when a node observes that one of its channels' utilization is higher than a pre-defined threshold. To this end, it is assumed that each node knows the traffic load and link status on the channels within the predetermined interference range (e.g., a two-hop neighbor range). This is rather a practical assumption since exchanging information within two hop neighbors introduces acceptable and reasonable overhead by way of broadcasts. With such information (which is updated periodically), each node can estimate its link utilization and find a better JCAR pattern, if needed, in a distributed way.

Figure 4:
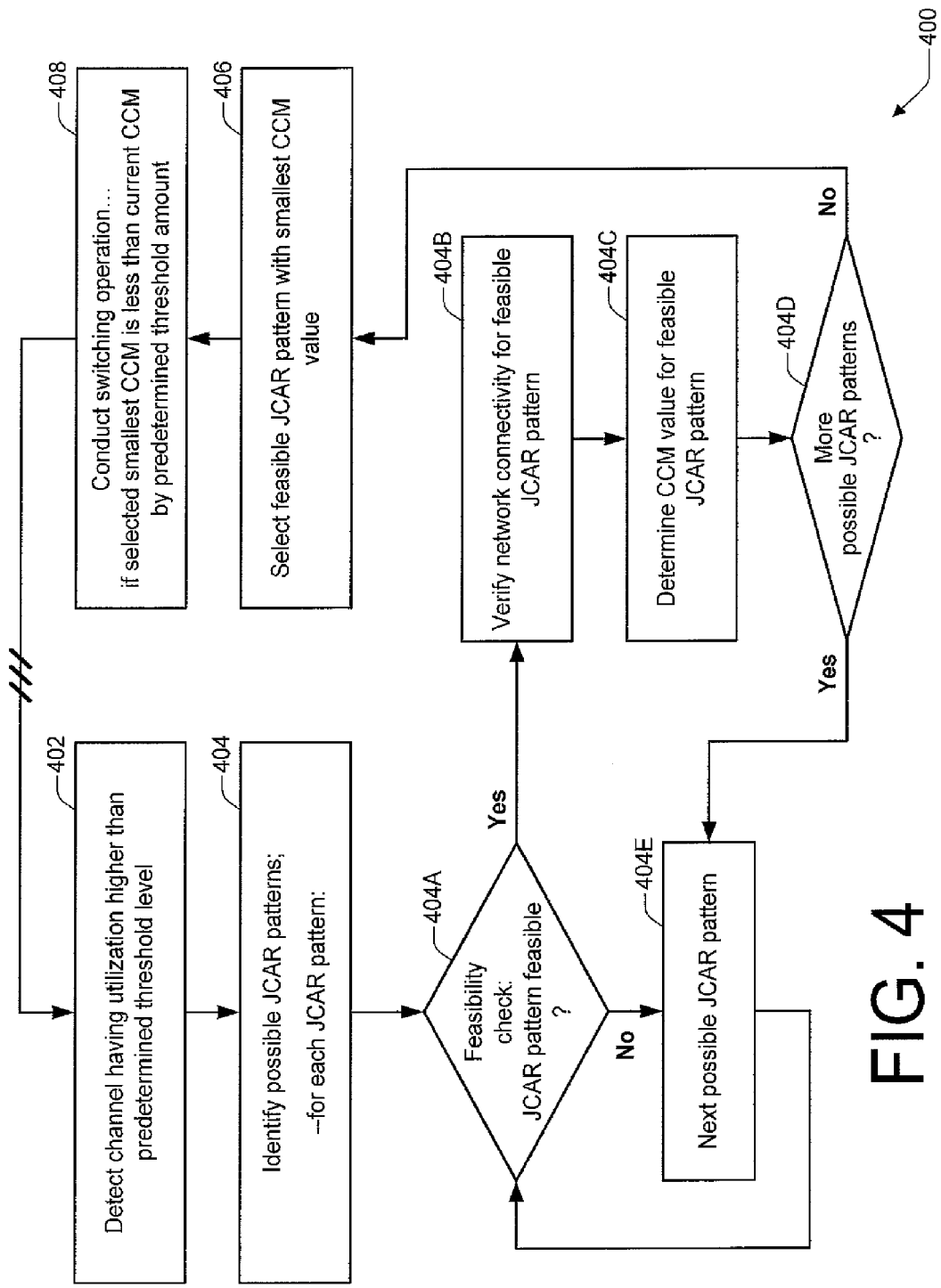
FIG. 4 is a flow diagram that illustrates an example of a method for JCAR in a wireless network.

FIG. 4 is a flow diagram 400 that illustrates an example of a method for JCAR in a wireless network. Flow diagram 400 includes nine (9) blocks. Although the actions of flow diagram 400 may be performed in other environments and with a variety of hardware, firmware, and software combinations, certain aspects of FIGS. 1-3 are used to illustrate an example of the method of flow diagram 400. For example, the actions of flow diagram 400 may be performed by a wireless node 102.

In a described implementation, starting at block 402, a channel having a utilization that is higher than a predetermined threshold level is detected. Detection attempts may be performed periodically. At block 404, possible JCAR patterns are identified. For each identified JCAR pattern, the actions of blocks 404A-404E and then 406 and 408 are performed.

At block 404A, a feasibility check is conducted to ascertain if the JCAR pattern is feasible. If not, then the method progress to block 404E. If, on the other hand, the possible JCAR pattern is ascertained to be feasible, then the method progresses to block 404B.

At block 404B, network connectivity for the feasible JCAR pattern is verified. Network connectivity is addressed herein below in subsection 3.3 with particular reference to FIG. 5. When network connectivity is not jeopardized by the feasible JCAR pattern, at block 404C a CCM value for the feasible JCAR pattern is determined. For example, CCM determiner 302 may determine the CCM value.

At block 404D, it is determined if there are more possible JCAR patterns. If so, then at block 404E, the next possible JCAR pattern is selected for the feasibility check at block 404A. Otherwise, if there are no more possible JCAR patterns, the method progresses from block 404D to block 406.

At block 406, the feasible JCAR pattern having the smallest CCM value is selected. At block 408, a switching operation is conducted if the selected smallest CCM value is less than a current CCM value by a predetermined threshold amount. The switching operation is conducted to reconfigure the network in accordance with the selected JCAR pattern. An example switching operation is described herein below in subsection 3.4 with particular reference to FIG. 6. The method of flow diagram 400 may be periodically repeated in a distributed fashion at each wireless node 102.

The algorithm is also described below in outline form. Generally, the following actions may be performed in a described implementation of a distributed algorithm at each node.

1. Identify a channel whose utilization is higher than a pre-defined threshold (at node i on channel l (402)

$F_i^l$(current pattern)$>=Th_H$

2. Identify some of the possible JCAR patterns and for each of the identified JCAR patterns (404),
    (i) check feasibility (404A)
    $F_i^l$(new pattern)$<=Th_F$
    (ii) check network connectivity (404B)
    (iii) determine its CCM value if feasible (404C)
3. Select a feasible pattern which has the smallest CCM value (406)
4. Conduct the switching operation (channel or interface change) if the value of CCM under the newly selected pattern is smaller than the value of CCM under the current pattern by a pre-defined threshold (408).

To find an optimal JCAR pattern, one relatively naïve approach may be to find all the possible SCAR patterns, then select a feasible pattern which has the smallest CCM value. However, it is quite time consuming to search all the patterns. In the following sub-sections, an efficient method to search only a limited set of possible JCAR patterns is described. (However, all of the possible JCAR patterns may alternatively be analyzed.)

In searching for new patterns, each pattern is specified to satisfy the following two conditions: 1) feasibility: the fraction of air time on each channel of the new pattern should be smaller than a pre-defined threshold, and 2) connectivity: the network is still connected. These two conditions ensure that a new pattern will not result in network partition and will not degrade the performance in terms of throughput. Furthermore, for a pattern with the smallest CCM value (and smaller than the current CCM value) within the limited set of patterns, the new pattern can be expected to improve the throughput performance. For a more robust algorithm in maintaining connectivity, a reconfiguration procedure is described below in subsection 5.3.

3.1 JCAR Candidate Pattern Selection

As mentioned above, to reduce complexity and avoid routing fluctuation, the description herein for searching for a new route (starting from the current route) is restricted by changing the interfaces between the current node and its one hop node, instead of permitting the changing of the entire path in the network. As a result, the node sequence on a given communication path remains the same, but the radio interfaces that a route uses may be changed. (However, actual implementations need not be so restricted.)

In a described implementation, a pattern selection subroute is triggered at node i when the load on a channel, say channel l, is overloaded (i.e., when the total FAT measured on node i for channel l is higher than a predefined threshold $TH_H$.) Node i initiates pattern selection by focusing on the following three categories, for each neighboring node j of channel l: 1) changing channels within the channel set to which channel l belongs; 2) changing the interface between nodes i and j; and 3) a combination of both channel change and interface switching of 1) and 2). For the sake of simplicity, it is assumed that the flows on the current channel are moved to the new channel if a new pattern is used.

3.2 Feasibility for CA and Routing

In a described implementation, a new JCAR pattern is considered feasible if the current throughput of the flows can be supported by this new pattern, i.e., if no flow suffers degradation in throughput. Because FAT is used to denote the normalized utilization on one channel, from a node point of view, the traffic on channel l and on its interfering links consume the air time on channel l. Therefore, assuming that the traffic rate of each flow is still maintained (under a possible JCAR pattern), the JCAR pattern is feasible if the total estimated air time among the interfering links on a given channel is less than a pre-defined threshold. That is, $$F_i^l \leq TH_F, \forall i \in V, \forall l \in L. \quad (14)$$

In an example implementation, the threshold is set to be $Th_F=1$, which ignores the potential time overlap periods (due to spatial reuse) during which those links may not interfere with each other. Thus, it is a conservative but sufficient condition.

3.3 Network Connectivity

Some JCAR patterns may result in network partitioning and these patterns should generally be avoided. In a described implementation, for each new feasible JCAR pattern, network connectivity is checked so as to ensure that the network under the new pattern is still connected. Verifying network connectivity, however, is a time consuming task as it may involve as many as all nodes in the network. To make the task of checking network connectivity easier, in searching for new patterns, the follow may be imposed: the connectivity invariance rule.

The connectivity invariance rule specifies that if any node-pair was originally connected, then the node-pair should still be connected under a new JCAR pattern. It should be noted that in a multi-radio situation, two nodes may have more than one pair of radios connected. The connectivity invariance rule only requires that at least one pair of radios be connected between the two nodes. According to this rule, only those patterns that are involved with switching channels (e.g., categories 1 or 3 above) between two nodes may result in network partition. Consequently, in the following, the focus is on these patterns. It should also be noted that this connectivity invariance rule is only a sufficient condition to ensure network connectivity.

If nodes i and j are connected only on one channel, say l, then j is called node i's single-channel-neighbor. The connectivity with single channels may break due to channel reassignment. This is shown by an example in FIG. 5.

Figure 5:
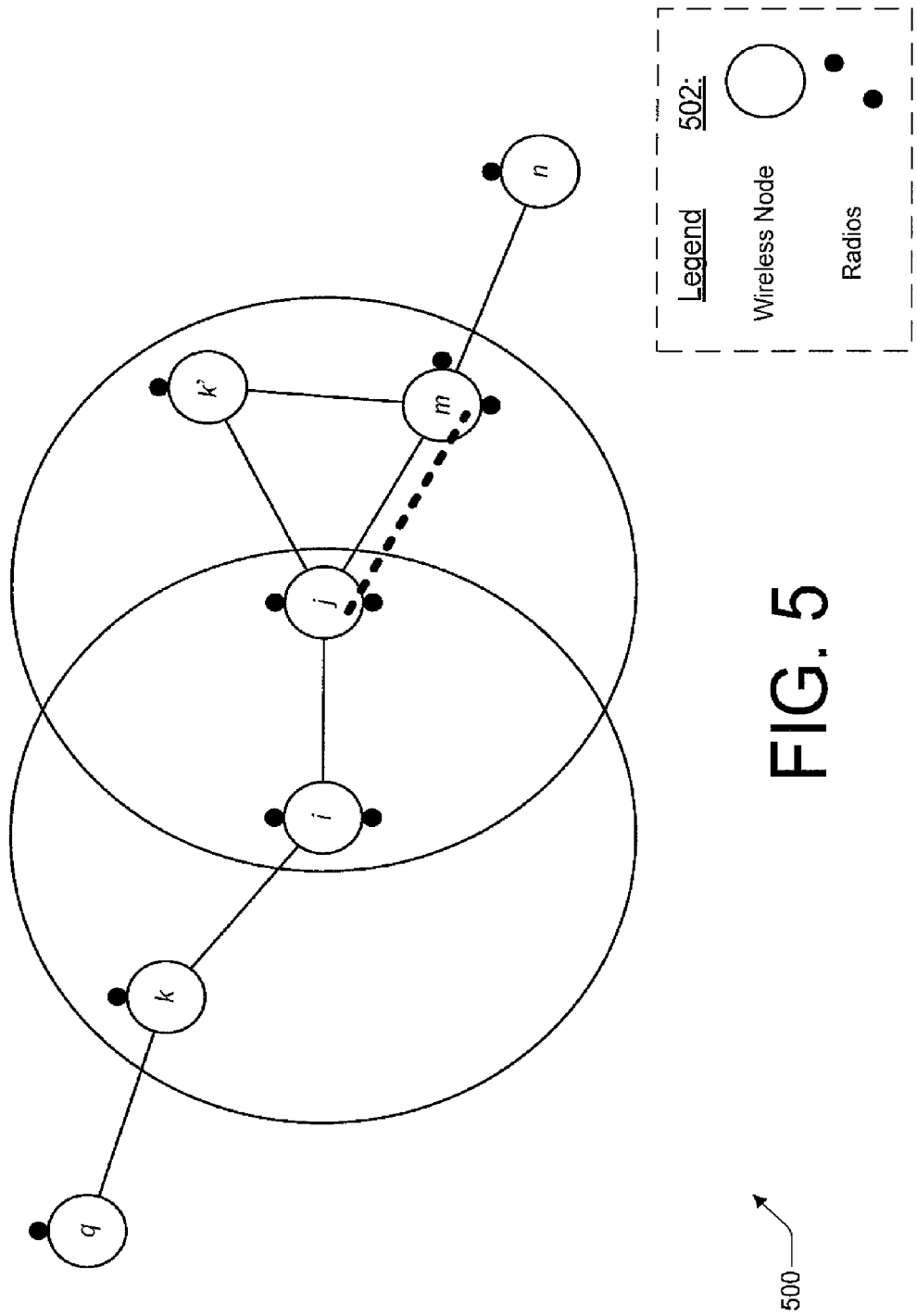
FIG. 5 is a block diagram illustrating an example of network connectivity issues.

FIG. 5 is a block diagram 500 illustrating an example of network connectivity issues. As indicated by legend 502, each larger, hollow circle represents a wireless node. These wireless nodes are labeled by q, k, i, j, k', m and n. Legend 502 also indicates that each smaller, solid circle represents a radio. As illustrated, some wireless nodes have one radio and some have two radios. Specifically, wireless nodes i, j, and m have two radios apiece, and wireless nodes q, k, k', and n have one radio apiece.

Different line types, thin solid or thick dashed, denote the different radio connectivity between nodes. It is given that nodes i and j using channel l want to switch to channel l'. On the same radio, single-channel-neighbor node k who is also using channel l must switch to channel l' as well (to obey the connectivity invariance rule). Similarly, if node k also has its single-channel-neighbor q on channel l, then the connectivity between nodes k and q will break if q does not switch with k. This connectivity concern may be propagated along a chain of nodes, when each node on the chain has only a single common channel. This scenario is termed herein a "chain puzzle".

A chain puzzle may cause a number of problems in practice. First, chain puzzles may involve a large number of nodes for a single channel switch, which can cause a high overhead. Second, because the signaling used for negotiation needs to propagate through many hops, it is difficult to synchronize the switching action among all of the nodes involved and, in the worst case, this may result in network partition. To remedy this issue, an example described implementation, avoids the JCAR patterns containing a chain puzzle. Thus, in the above example, node i should give up the channel switching with node j.

It should be noted that even for a neighbor with multiple radios, it may still suffer the chain puzzle problem. For example, node m is a multi-radio neighbor of node j on channel l, where a dashed line denotes another connection between j and m in FIG. 5. If node m has single channel connectivity on channel l with node k' (a single radio neighbor of node j on channel l), then it should also be checked whether node m contains a chain puzzle because its single-channel-neighbor (e.g., node n in FIG. 5) is also required to switch the channel so that the connectivity invariance rule still holds.

For a described implementation, an algorithm to check connectivity may be executed as follows. The algorithm uses two-hop neighbor information, which is obtained through broadcast. It is assumed that nodes i and j are using channel l and that node i wants to switch to another channel with node j. Node i checks whether the topology contains a chain puzzle with node j based on the two hop information. In addition, it also identifies some of their neighbor nodes (i.e., node i or j's two-hop neighbors) to switch the channel with nodes i and j at the same time. After negotiation, both node i and j broadcast this switching request to their one-hop neighbors. If one of their one-hop neighbors detects a chain puzzle that is not identified by node i or j due to out-of-date information, the switch request is denied.

Example pseudo code for the algorithm and some notation that is used to derive the algorithm are presented below in subsection 5.1. The algorithm either returns a set of nodes that will switch with nodes i and j or indicates that the switch is denied.

3.4 Distributed Joint CA and Routing (JCAR)

Based on the metrics described in subsection 2, the actions described at the beginning of section 3, and the details described in the previous subsections 3.1-.3.3, example pseudo codes for an implementation of the distributed JCAR algorithm are presented below in subsection 5.2. In these pseudo codes, $TH_{CA}$ is a negative value and denotes the threshold on the difference of CCM values between the current and the newly-selected JCAR patterns. If the CCM value under the new pattern is smaller than the current one by a pre-defined threshold, then node i starts the operation for CA and routing switching (with node j identified by the new pattern). For interface switching, the action is taken locally between nodes i and j. For channel switching, on the other hand, a distributed procedure is required to increase the chances, if not guarantee, that all of the neighbor nodes accept such changes. An example implementation of such a distributed procedure is described below with particular reference to FIG. 6.

Figure 6:
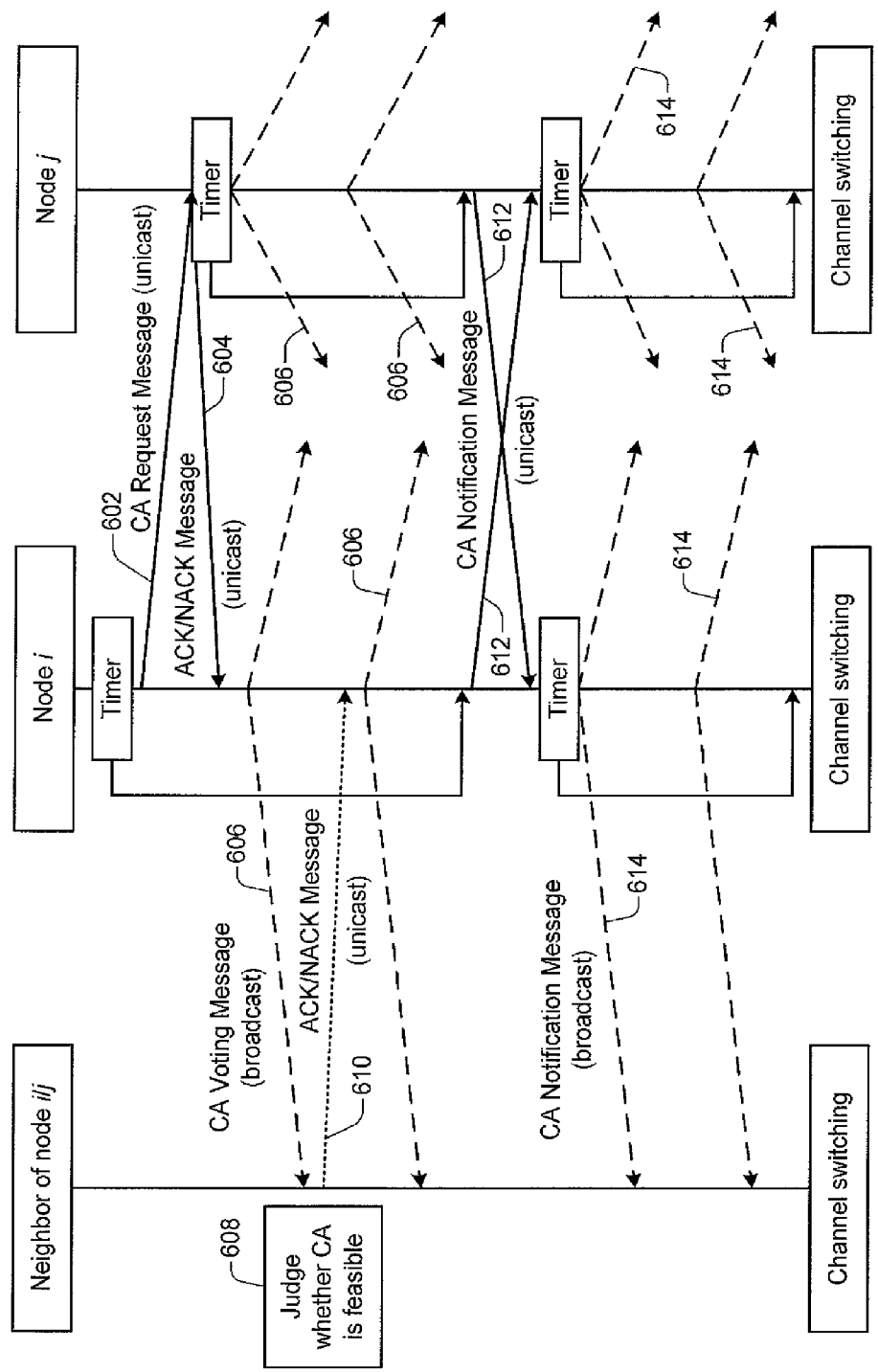
FIG. 6 is an example message sequence diagram among nodes in a wireless network for a network configuration switching operation.

FIG. 6 is an example message sequence diagram 600 among nodes in a wireless network for a network configuration switching operation. The nodes are node i, node j, and the neighbors thereof. The exchange of messages constitutes an example negotiation that is to lead to a channel switching operation. The operation for channel switching negotiation includes timers, CA request messages, CA voting messages, and CA notification messages. Messages represented by solid lines are unicast messages. Messages represented by long dashed lines are broadcast messages. The existence of the short dashed message line is dependent on which ACK approach is taken, as is described below.

In a described implementation, based on the JCAR algorithm, if node i decides to switch channels with a neighbor j, node i sends a CA request message 602 to node j to indicate that it wishes to switch channel l to l' and expects the neighboring nodes in Q (as defined in subsection 5.1) to switch together. Node j will send feedback with an ACK/NACK message 604 to confirm/reject the switching request. If the result is NACK or no feedback is received at node i after a timeout period, then node i regards the channel switching request as having failed.

Otherwise, both node i and node j broadcast a CA voting message 606 $n_{vot}$ times to their neighbor nodes including the nodes in Q. The broadcasting is performed $n_{vot}$ times to ensure that the message is received successfully with a high probability. An example value for $n_{vot}$ is 3, but other values may be used. Each neighbor of node i or node j that receives the intended channel switching message decides whether the decision is acceptable 608 and votes its decision. Two types of voting methods are possible: 1) no NACK (no NACKs received implies that all other nodes agree); or 2) explicit ACK (ACKs are received to indicate confirmation). The former method is selected for an example implementation to save signaling overhead.

Thus, if node i(j) does not receive any NACK 610, it sends out a CA notification message 612 to j(i). When no neighbor of node i or j disagrees, both nodes i and j send out broadcast CA notification messages 614 to confirm the switching to all neighbors for $n_{notf}$ times ($n_{notf}$ is used to ensure that the confirmation message can be received with a high probability). Then nodes i, j, and those in Q switch channels accordingly.

It should be noted that those neighbors either follow or reject the switching request and that they do not start another negotiation procedure with their neighbors. In addition, the voting period is designed to avoid undesirable channel switching due to outdated information or a possible conflicting CA initiated by other nodes. Nevertheless, described protocol implementations are designed to support parallel negotiations on multiple channels with heterogeneous radios at a node.

No single CA/interface pattern is optimal for all scenarios; hence, the current pattern should be adjusted periodically. Diverse channel allocation improves the throughput performance for conflicting traffic, but it can reduce the connectivity between nodes or increase the possibility of a chain puzzle. In order for described implementations of the JCAR algorithm to have more candidate patterns and to reduce the possibility of creating a chain puzzle, a refined channel reconfiguration procedure is described below in subsection 5.3. This refined channel reconfiguration procedure attempts to re-arrange channel assignment when the traffic load is light so that the connectivity can be enlarged.

4. System Design and Implementation

In this subsection, an example software module implementation is described for distributed CA and routing in a $M^3WN$. The architecture of an example Layer 2.5 JCAR module is described first. Second, example interactions between the JCAR Layer 2.5 and a routing Layer 3 and between the JCAR Layer 2.5 and a MAC Layer 2 are described.

4.1 Protocol Stack

Figure 7:
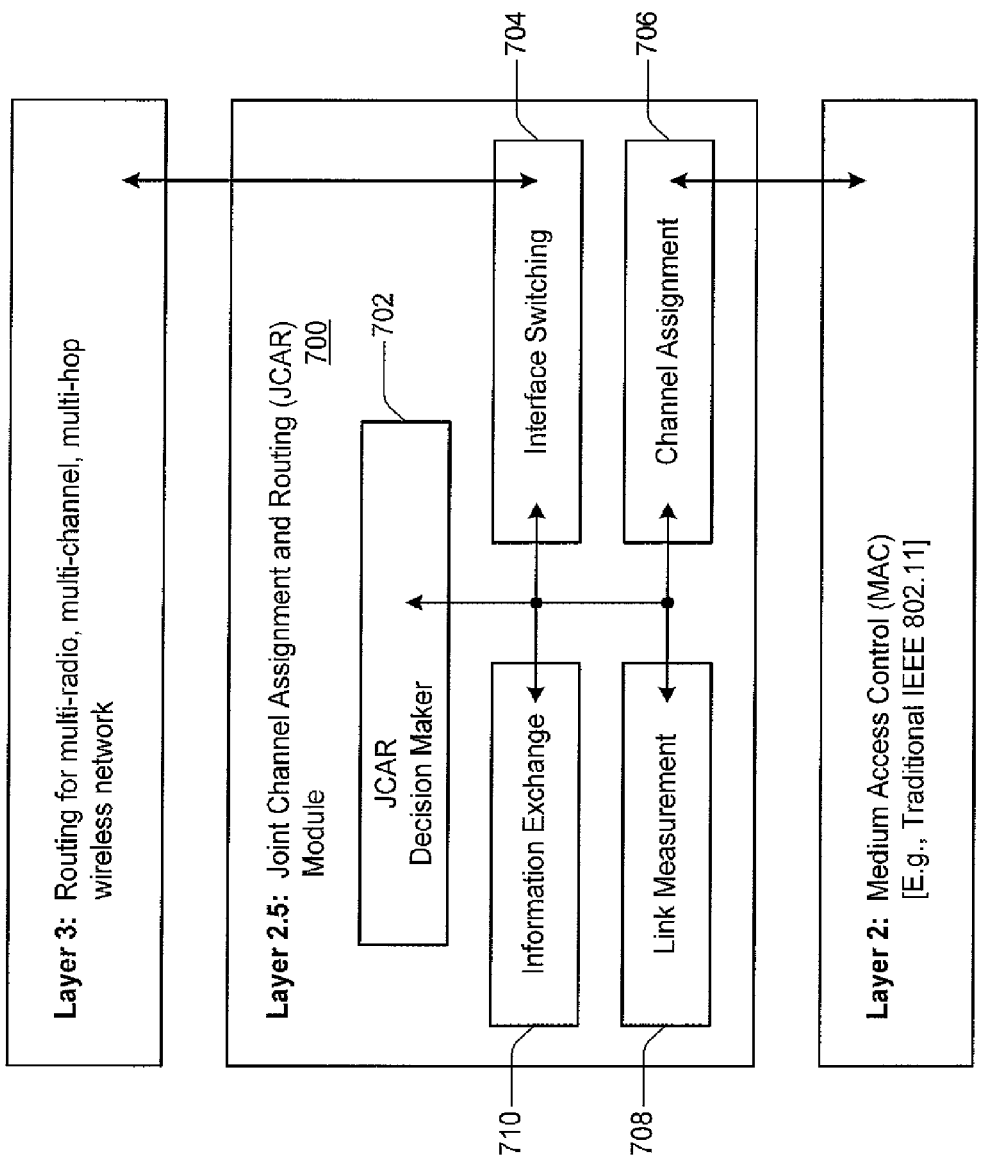
FIG. 7 is a block diagram of an example Layer 2.5 JCAR module shunted between layers 2 and 3 of a wireless network communications stack.

FIG. 7 is a block diagram of an example Layer 2.5 JCAR module 700 that is shunted between layers 2 and 3 of a wireless network communications protocol stack. Layer 3 is responsible for routing in a multi-radio, multi-channel, multi-hop wireless network ($M^3WN$). Layer 2 is for medium access control (MAC) (e.g., as in a traditional IEEE 802.11 network). One benefit of placing the example JCAR module at Layer 2.5 is that it facilitates JCAR interaction with off-the-shelf hardware (e.g., 802.11 DCF NIC) as well as current routing protocols for M³WNs.

As illustrated, the architecture of JCAR module 700 includes five (5) modules 702-710. These five modules are: a JCAR decision maker module 702, an interface switching module 704, a channel assignment module 706, a link measurement module 708, and an information exchange module 710. In a described implementation, channel assignment module 706 communicates with the MAC Layer 2, and interface switching module 704 communicates with the wireless network routing Layer 3.

Link measurement module 708 measures those link parameters used in the JCAR algorithm as described above. Information exchange module 710 facilitates the sharing of link parameters with other wireless nodes that are executing a distributed JCAR procedure. Measured link parameters are transmitted to other wireless nodes, and link parameters that are measured by other nodes are received and processed. JCAR decision maker 702 calculates ETTs, FATs, and CCMs and also performs the core of the JCAR algorithm.

The functions of the four modules 704-710 are designed as follows. Current hardware does not automatically provide enough information to make a CA decision, so a link status measurement module 708 is deployed to obtain the relevant information (e.g., time varying link capacity due to auto-rate taken at MAC, frame loss ratio on wireless links, etc.). In addition, the traffic rate on a link, i.e., $r_{(i,j)}$, is measured using a sliding window algorithm (e.g., with a default window size of 5 seconds). With information exchange module 710, each node broadcasts to exchange the traffic information, capacity, and loss ratio on each of the links between the node and its neighbors. Subsequently, the collected information on its neighbor nodes is likewise broadcasted. Thus, each node is able to obtain the traffic, capacity, and loss ratio for each link within its predetermined interference range (e.g., of two hops).

4.2 Interaction with MAC and Routing

For a described implementation, a SCAR Layer 2.5 module 700 does not require special support from the MAC layer. With the limited interfaces provided by current commercialized hardware, channel assignment module 706 of JCAR can obtain most of the link status information (e.g., link loss ratio and link capacity) using probing. Different wireless NICs may have different delays (overhead) in switching channels. The channel switching delay is usually dependent on both the hardware and the driver. In order to minimize or at least reduce this switching overhead, an example implementation involves restricting the channel switching frequency to once per minute. In addition, to avoid simultaneous channel switching in a flow having a high volume, a guardian timer may be set with a randomly-chosen value. When the channel stays busy longer than the guarding timer, the JCAR decision maker is triggered.

The interaction between interface switching module 704 and the routing Layer 3 can be relatively simple to implement if only the outgoing interface is changed for the traffic to the next hop instead of the whole path for each flow. It should be noted that for channel switching, because the outgoing link has switched to a new channel, the cached link status is out of date. In this case, the link status aware routing protocol can be modified to reset the link quality parameters. Generally speaking, JCAR implementations may be employed with any routing protocol that can be applied to multi-radio, multi-channel, multi-hop wireless networks.

5. Example Algorithms and Refinements

Two example algorithms are described in greater detail below. The first example algorithm relates to checking network connectivity (Section 5.1). The second example algorithm relates to the distributed JCAR algorithm generally (Section 5.2). A refinement directed to channel reconfiguration is also described (Section 5.3).

5.1 Example Algorithm to Check Network Connectivity

Notation is introduced first. For node i, the set of its neighbor nodes on channel l is denoted as $N_i^l$, then the whole set of neighbor nodes of node i is $N_i = \cup_l N_i^l$. The set $N_i$ is further divided into two classes, which are denoted by $N_{i,s}$ and $N_{i,m}$, respectively, where $N_{i,s}$ includes the nodes connecting to node i using exactly one channel, and $N_{i,m} = N_i - N_{i,s}$. Also, let $N_{i,s}^l$ denote the set of all single radio neighbors of node i on channel l. Furthermore, $N_{i,m}^l = N_i^l - N_{i,s}^l$ denotes the multi-radio neighbors of node i, but each of them has at least one connection to node i (i.e., the connection on channel l).

There is an additional factor, the possibility of a chain puzzle, to consider when checking whether the connectivity can be maintained under a new SCAR pattern. As shown in FIG. 5, to maintain connectivity, a neighbor node $k \in N_{i,s}^l \cup N_{j,s}^l$ (that has single channel connectivity with node i or j on channel l), should switch channels with node i and j. However, if node k further has its single channel neighbor q on l that is not a neighbor node of node i or j (i.e., $N_{k,s}^l - N_{j,s}^l \cup N_{i,s}^l \neq \{0\}$), then the connectivity of nodes k and q will break if q does not switch with k.

In the above example, if a simplified approach is preferred, node i should give up the channel switching with node j. It should be noted that even for a neighbor with multiple radios, it may still have the chain puzzle problem. For example, node m is a multi-radio neighbor of node j, where a dashed line denotes the case when there is another connection between j and m in FIG. 5. If node m has single channel connectivity on l with any node $k \in N_{i,s}^l \cup N_{j,s}^l$, then it should also be checked whether m contains a chain puzzle because it needs to switch channels to maintain the connectivity with m.

Example connectivity maintenance procedures are summarized in pseudo code below. The pseudo code algorithm returns either a set of nodes Q that will switch with nodes i and j or indicates that the switch is denied. The example pseudo code for connectivity maintenance procedures (block 404B of FIG. 4) is as follows:

```
Connectivity(i,j,l){
Define: Ñ_{i,j,s}^l = N_{j,s}^l ∪ N_{i,s}^l - {i} - {j}
        Ñ_{i,j,m}^l = N_{j,m}^l ∪ N_{i,m}^l - {i} - {j}
Variable: Q = Ñ_{i,j,s}^l
1  Scan :
2  For each k' ∈ Ñ_{i,j,m}^l - Q
3     If (∃k ∈ Q AND k' ∈ N_{k,s}^l)
4        {Q = Q ∪ {k'}; go to Scan;}
5  For each k ∈ Q
6     If (N_{k,s}^l - N_{j,s}^l ∪ N_{i,s}^l ≠ {0}) {return FALSE;}
7  return Q;
}
```

5.2 Example Algorithm for a Distributed JCAR Algorithm

An example distributed JCAR algorithm is described herein above in flowchart form, in outline form, and in textual form, particularly with reference to FIG. 4. The following is example pseudo code for a distributed JCAR algorithm. The following pseudo code portion is primarily directed to when the JCAR algorithm is triggered because of high channel utilization (block 402 of FIG. 4) and when a new pattern is deployed due to its CCM being sufficiently low (block 408):

```
Variable : Δ_cache = TH_CA, p_cache = p̄ (the current JCAR pattern)
When F_i^l > Th_H, trigger JCAR for channel l
1    For each node j ∈ N_i^l
2        Pattern selection : P = Pattern(i, j, l);
3        For each pattern p ∈ P
4            Δ_p = CCM_{i,p} − CCM_{i,p̄};
5            If (Δ_p < Δ_cache) {
6                Δ_cache = Δ_p; p_cache = p;}
7        If (p_cache ≠ p̄) {deploy new pattern p_cache;}
```

The following pseudo code portion is primarily directed to identifying JCAR patterns (block 404), checking feasibility (404A), determining CCM values (block 404C), and ranking JCAR patterns by CCM values (block 406):

```
Pattern(i,j,l) {
Variable : P = P' = P'' = P^t = {0};
1    //CA pattern selection :
2    If (Connectivity(i,j,l) ≠ FALSE) {
3        Sort channel set S = {î ∈ CS(l)} by F_i^l from least;
4        For each î ∈ S
5            Pattern set P = {pattern : l → î}
6            For each p ∈ P
7                If (feasiblity(p) == FALSE) {P = P−{p};}
8            If (P ≠ {0}) goto next;
9    }
10   next : //routing pattern selection
11       For channel ĩ (between i and j, heterogeneous to l)
12           P' = P'∪{Pattern : move traffic from l to ĩ}
13           For each p ∈ P'
14               If (feasiblity(p) == FALSE) {P' = P'−{p};}
15   //pattern with both CA and routing selection:
16       For each channel ĩ (between i and j, heterogeneous to l)
17           If (Connectivity(i,j,ĩ) ≠ FALSE) {
18               Sort channel set S = {ĩ' ∈ CS(ĩ)} by F_i^{ĩ from least};
19               For each ĩ' ∈ S
20                   P' = {Pattern: ĩ → ĩ', and move traffic from l to ĩ'}
21                   For each p ∈ P'
22                       If (feasiblity(p) == FALSE) {P' = P' − {p};}
23                   If (P' ≠ {0})
24                       {P'' = P''∪P'; jump out(For each ĩ' ∈ S);}
25           }
26   return P = P∪P'∪P'';
```

5.3 Further Refinement—Channel Reconfiguration

As noted above with certain implementations, a newly-constructed CA pattern is only suitable for traffic on certain paths, and it may increase the possibility of a chain puzzle developing because connectivity maintenance is designed to only ensure that there is at least one channel between a node pair. When the channel utilization on channel l is fairly low, to make the CA more diverse and more flexible for future traffic and to reduce the possibility of creating a chain puzzle, a reconfiguration operation may be performed. This operation attempts to switch channel l to the one that has been used mostly in the neighborhood of a node so that the connectivity for all node pairs within a two-hop or other size interference range is increased.

An example procedure for channel reconfiguration is as follows: 1) when the utility of one channel is lower than a certain threshold, it triggers the channel reconfiguration operation; 2) for each neighbor node, it estimates the effect of a channel switch for $Q=N_i^l \cup N_j^l$, and it removes those patterns that result in network partition; 3) it selects the channel l' that is supported by the interface and that satisfies the following—$F_i^{l,l'*} < F_i^{l',l*}$ and $F_i^{l,l'*} + F_i^{l',l*} < Th_H - \delta$; and 4) if l' exists, it selects the CA resulting in the largest connectivity, where a connectivity between any two nodes within the set of the two hop neighbors of both i and j is counted by 1. Then the channel switching operation is initiated.

Therefore, example implementations of the distributed JCAR protocol utilize certain diverse channel and routing patterns to improve the performance of a system when the traffic load is high and utilize as few channels as possible to enlarge connectivity between nodes when the traffic load is fairly light (e.g., using a connectivity module). Intuitively, utilizing a few common channels makes the network topology flexible and reduces the possibility of a chain puzzle arising in future patterns, which in turn gives more choices for selecting new JCAR patterns. Thus, an example two-way implementation for distributed JCAR works as follows:

1) when the FAT on a channel is higher than $Th_H$, the distributed JCAR algorithm is triggered to search for new patterns that may have a smaller CCM; and 2) when the FAT on a channel is lower than $Th_L$, the procedure to reconfigure the channels for larger connectivity is triggered.

6. Example Device Implementations

Figure 8:
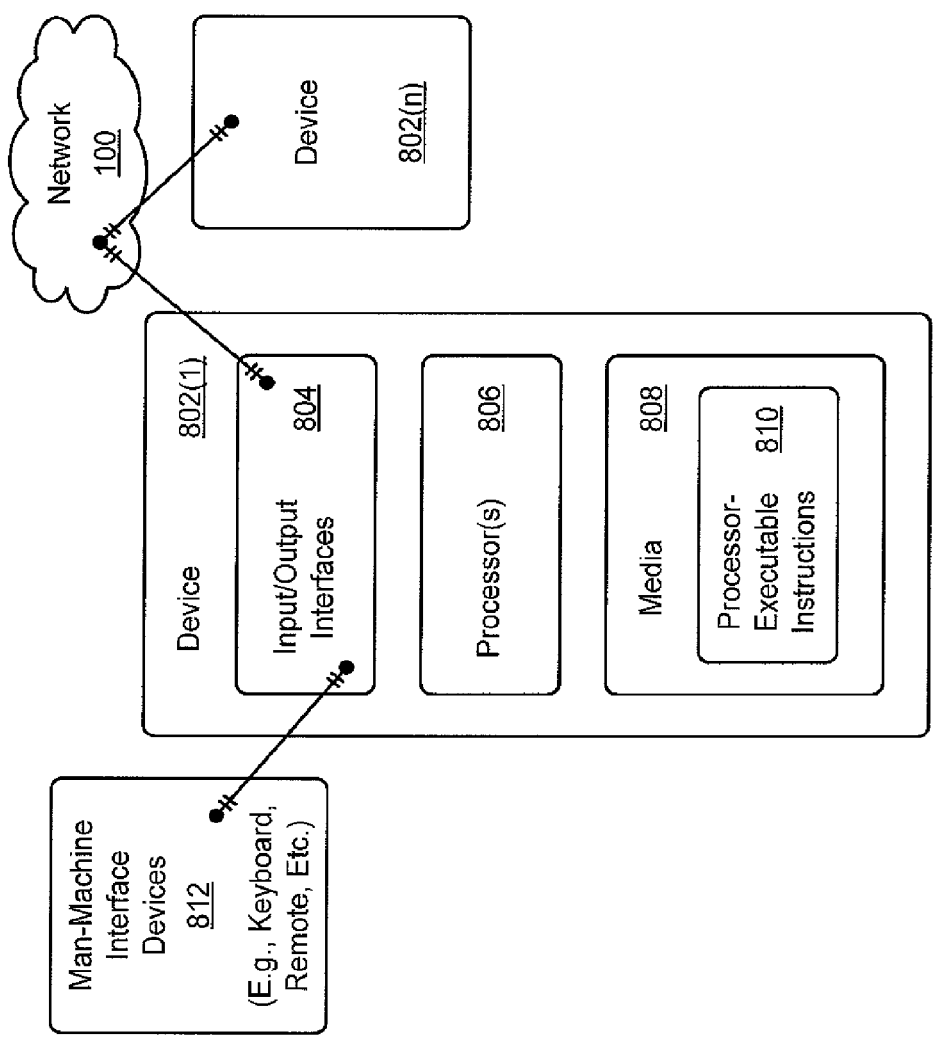
FIG. 8 is a block diagram of an example device that may be used to implement JCAR in wireless networks.

FIG. 8 is a block diagram of an example device 802 that may be used to implement JCAR in wireless networks. Multiple devices 802 are capable of forming and communicating over one or more networks 100 (of FIG. 1). Hence, wireless nodes 102 may be realized as devices 802. Network 100 may be any network or portion thereof that is formed at least partially of wireless nodes 102. Thus, network 100 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, some combination thereof, and so forth.

As illustrated, two devices 802(1) and 802(n) are capable of engaging in message communication transmissions via network 814. Message communications include, by way of example but not limitation, the exchange of wireless network parameters, interactions to effectuate a network configuration switching operation, and so forth. Although two devices 802 are specifically shown, one or more than two devices 802 may be employed, depending on implementation.

Generally, a device 802 may represent any computer or processing-capable device, such as a server device; a workstation or other general computer device; a data storage repository apparatus; a personal digital assistant (PDA); a mobile phone; a gaming platform; an entertainment device; a router computing node; a mesh network node, some combination thereof; and so forth. As illustrated, device 802 includes one or more input/output (I/O) interfaces 804, at least one processor 806, and one or more media 808. Media 808 include processor-executable instructions 810.

In a described implementation of device 802, I/O interfaces 804 may include (i) a network interface for communicating across network 100, (ii) a display device interface for displaying information on a display screen, (iii) one or more man-machine interfaces, and so forth. Examples of (i) network interfaces include a network card, a modem, one or more ports, a network communications stack, a radio 104, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 812 (e.g., a keyboard, a remote, a mouse or other graphical pointing device, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802.

Thus, realizations for JCAR in wireless networks may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Media 808 may be any available media that is included as part of and/or accessible by device 802. It includes volatile and non-volatile media, removable and non-removable media, and storage and transmission media (e.g., wireless or wired communication channels). For example, media 808 may include an array of disks for longer-term mass storage of processor-executable instructions 810, random access memory (RAM) for shorter-term storing of instructions that are currently being executed and/or otherwise processed, link(s) on network 100 for transmitting communications, and so forth.

As specifically illustrated, media 808 comprises at least processor-executable instructions 810. Generally, processor-executable instructions 810, when executed by processor 806, enable device 802 to perform the various functions described herein. Such functions include, but are not limited to: (i) those provided by the components that are illustrated in FIG. 3; (ii) those actions that are illustrated in flow diagram 400 (of FIG. 4); (iii) the transmitting, receiving, processing, etc. of those messages that are illustrated in FIG. 6; (iv) realizing the Layer 2.5 JCAR module 700 that is illustrated in FIG. 7; and so forth. By way of example only, processor-executable instructions 810 may include a CCM determiner 302, a JCAR implementer 308, a JCAR module 700, some combination thereof, and so forth.

The devices, actions, aspects, features, functions, procedures, modules, data structures, protocols, wireless nodes, messages, components, etc. of FIGS. 1-8 are illustrated in diagrams that are divided into multiple blocks. However, the order, interconnections, interrelationships, layout, etc. in which FIGS. 1-8 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for JCAR in wireless networks.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device that functions as a wireless node in an ad hoc wireless network, the device comprising:
    a plurality of heterogeneous radios to communicate wirelessly over at least one link on at least one channel of the ad hoc wireless network; and
    a channel cost metric (CCM) determiner configured to determine a CCM value, the CCM determiner comprising:
        an expected transmission time (ETT) determiner to determine an ETT value, the ETT value being a unit of time calculated as a function of collision probability on the link, traffic loading on the link, expected total traffic on the link, and average transmission time of one data frame across the link; and
        a fraction of air time (FAT) determiner to determine a FAT value that represents a total consumed air time proportion of a given interval;
    wherein the CCM determiner determines the CCM value utilizing both the determined ETT value and the determined FAT value such that the CCM value reflects expected transmission time on each channel as weighted by channel utilization; and
    a joint channel assignment and routing (JCAR) implementer configured to evaluate one or more CCM values determined by the CCM determiner and to jointly switch a channel and a route between wireless nodes in the wireless network to lower the CCM value.

2. The device as recited in claim 1, wherein the ETT value is determined by the ETT determiner on a per-wireless-node basis.

3. The device as recited in claim 2, wherein the ETT value is determined by the ETT determiner based on ETTs on a particular channel for multiple links that are within a predetermined interference range of the wireless node.

4. The device as recited in claim 1, wherein the FAT value is determined by the FAT determiner on a per-wireless-node basis.

5. The device as recited in claim 4, wherein the FAT value comprises an equivalent FAT value that is determined relative to a common reference channel.

6. The device as recited in claim 1, wherein the the JCAR implementer switches the channel and the route between wireless nodes in the wireless network to lower the CCM value to a lowest CCM level determined for the wireless network.

7. A method performed by a device that functions as a wireless node, the method comprising:
    identifying multiple possible joint channel assignment and routing (JCAR) patterns for a wireless ad hock network, wherein at least one JCAR pattern denotes a combined solution that jointly considers channel assignment and routing between wireless nodes in the wireless network;
    determining respective channel cost metric (CCM) values corresponding to respective JCAR patterns for at least a portion of the possible JCAR patterns, each CCM value responsive to an expected transmission time (ETT) for transmitting one or more packets across at least one link that is weighted by fraction of air time (FAT), with FAT representing a proportion of channel utilization, the ETT for transmitting at least one of the one or more packets across the at least one link being calculated as a function of offered traffic load, an expected total traffic including retransmissions and an average transmission time of one data frame;
    selecting the JCAR pattern that corresponds to a smallest CCM value; and if the smallest CCM value corresponding to the selected JCAR pattern is less than a current CCM value corresponding to a current JCAR pattern, conducting a switching operation to implement the selected JCAR pattern in the wireless network.

8. The method as recited in claim 7, further comprising:
detecting a channel having a utilization that is higher than a predetermined threshold level;
wherein the identifying, the determining, the selecting, and the conducting are performed responsive to the detecting.

9. The method as recited in claim 7, further comprising:
checking if each possible JCAR pattern is feasible by checking that a total estimated air time among interfering links on a given channel is less than a pre-defined threshold.

10. The method as recited in claim 9, further comprising:
verifying network connectivity for each possible JCAR pattern that is checked as being feasible by verifying that each node-pair that is currently connected is maintained as being connected under the possible JCAR pattern.

11. The method as recited in claim 10, wherein the portion of possible JCAR patterns for the determining of CCM values comprises those possible JCAR patterns that are checked as being feasible and that are verified as maintaining network connectivity.

12. The method as recited in claim 7, wherein the conducting of the switching operation to implement the selected JCAR pattern in the wireless network is performed if the smallest CCM value corresponding to the selected JCAR pattern is less than the current CCM value corresponding to the current JCAR pattern by a predetermined threshold amount.

13. The method as recited in claim 7, further comprising:
receiving performance parameters about links in the wireless network that are within an interference range of the device that is performing the method;
wherein the determining is performed using the received performance parameters and an ETT that is calculated on a per-wireless-node basis.

14. The method as recited in claim 7, wherein the conducting of the switching operation is aborted prior to completion if a wireless node detects a chain puzzle in which wireless nodes are connected by a single channel.

15. One or more processor-accessible media embodied with processor-executable instructions, the processor-executable instructions comprising:
a link status measurement module configured to obtain and share a traffic rate parameter, a time varying link capacity parameter, and a link loss ratio parameter, for each link between nodes on a Multi-radio Multi-channel Multi-hop Wireless Network ($M^3WN$), at least one of the nodes comprising a plurality of heterogeneous radios;
a channel assignment module to communicate with a medium access control (MAC) layer;
an interface switching module to communicate with a routing layer; and
a joint channel assignment and routing (JCAR) decision maker to make decisions on whether to switch a network configuration responsive to a channel cost metric (CCM), the CCM based on an expected transmission time (ETT) that is weighted by a frequency of air time (FAT), wherein the FAT reflects a channel utilization and ETT is determined across a link $L_{(i,j)}^{l}$ between nodes i and j as $ETT_{(i,j)}^{l} = T_{(i,j)}^{l,DATA}/(1-p_{(i,j)}^{l})$, where $T_{(i,j)}^{l,DATA}$ denotes an average transmission time of one data frame on the link, and $p_{(i,j)}^{l}$ is a collision probability (due to interference) for link $L_{(i,j)}^{l}$ on a per-wireless-node basis, wherein network configuration switching comprises a joint channel assignment and routing switch between wireless nodes such that a network partition is avoided.

16. The one or more processor-accessible media as recited in claim 15, wherein the JCAR decision maker is further to request the channel assignment switch with an adjacent wireless node and to enable neighbor wireless nodes to vote on the channel assignment switch.

17. The one or more processor-accessible media as recited in claim 15, wherein the routing switch comprises a radio interface change.

18. The one or more processor-accessible media as recited in claim 15, wherein the channel assignment module obtains the traffic parameter, the capacity parameter, and the loss ratio parameter for each link within a predetermined interference range of a wireless node by interacting with the MAC layer using probing.

19. The one or more processor-accessible media as recited in claim 15, wherein the JCAR decision maker is triggered to search for new network configuration patterns that have a smaller CCM when the FAT on a channel is higher than a predetermined threshold.

20. The one or more processor-accessible media as recited in claim 19, wherein the processor-executable instructions further comprise:
a connectivity module to reconfigure channel assignments so as to enlarge network connectivity when the FAT on a channel is lower than a predetermined threshold.

* * * * *